(12) United States Patent
Xu et al.

(10) Patent No.: US 12,184,401 B1
(45) Date of Patent: Dec. 31, 2024

(54) PASSIVE OPTICAL TAP AND ASSOCIATED METHODS

(71) Applicant: CABLE TELEVISION LABORATORIES, INC., Louisville, CO (US)

(72) Inventors: Mu Xu, Broomfield, CO (US); Luis Alberto Campos, Superior, CO (US); Curtis D. Knittle, Superior, CO (US); Haipeng Zhang, Broomfield, CO (US); Zhensheng Jia, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 116 days.

(21) Appl. No.: 17/966,710

(22) Filed: Oct. 14, 2022

Related U.S. Application Data

(60) Provisional application No. 63/256,402, filed on Oct. 15, 2021.

(51) Int. Cl.
   *H04J 14/02* (2006.01)
   *H04Q 11/00* (2006.01)

(52) U.S. Cl.
   CPC ...... *H04J 14/0204* (2013.01); *H04Q 11/0067* (2013.01)

(58) Field of Classification Search
   CPC .................. H04J 14/0204; H04Q 11/0067
   USPC .......................................................... 398/83
   See application file for complete search history.

(56) References Cited

U.S. PATENT DOCUMENTS

| | | | | |
|---|---|---|---|---|
| 9,002,204 | B2 * | 4/2015 | Cvijetic | H04J 14/0265 398/76 |
| 2010/0226649 | A1 * | 9/2010 | Cheng | H04J 14/0238 398/72 |
| 2020/0196035 | A1 * | 6/2020 | Rousseaux | H04J 14/0206 |
| 2022/0086540 | A1 * | 3/2022 | Rousseaux | H04J 14/0206 |

FOREIGN PATENT DOCUMENTS

| | | | | |
|---|---|---|---|---|
| EP | 1876736 A1 | * | 1/2008 | ........... H04B 10/032 |
| EP | 1953941 A1 | * | 8/2008 | ............. H04J 14/02 |
| TW | 1387765 B | * | 3/2013 | |
| WO | WO-2014071639 A1 | * | 5/2014 | ........ H04B 10/0771 |

* cited by examiner

*Primary Examiner* — Abbas H Alagheband
(74) *Attorney, Agent, or Firm* — Cozen O'Connor

(57) ABSTRACT

A passive optical tap includes a first wavelength division multiplexer (WDM), a second WDM, a first optical splitter, and a second optical splitter. The first wavelength division multiplexer (WDM) has a first plurality of single-channel ports. The second WDM has a second plurality of single-channel ports. The first optical splitter has a first combined-power port optically coupled to a first one of the first plurality of single-channel ports and a first split-power port optically coupled to a first one of the second plurality of single-channel ports. The second optical splitter has a second combined-power port optically coupled to a second one of the second plurality of single-channel ports and a second split-power port optically coupled to a second one of the first plurality of single-channel ports.

20 Claims, 7 Drawing Sheets

PASSIVE OPTICAL TAP AND ASSOCIATED METHODS

CROSS-REFERENCE TO RELATED APPLICATIONS

This application claims priority to U.S. Provisional Patent Application No. 63/256,402, filed on Oct. 15, 2021, the disclosure of which is incorporated herein by reference in its entirety.

BACKGROUND

As demand increases for higher data rates and reliability, the existing network infrastructures continue to be challenged. Many cable operators demand that next-generation passive optical access networks support higher symmetrical sustained data rate per user, longer fiber transmission length, and a higher splitting ratio. Next-generation networks, such as passive optical network (PON) 2, or NG-PON2, and 25G/50G ethernet PON (EPON), include support for increased bandwidth demand. As PONs evolve toward higher data rates, coherent optical technology is a promising solution because of its superior performance and vast potentials. While traditional direct-detection PONs are limited in modulation bandwidth, transmission distance, and receiver sensitivity, coherent passive optical networks (CPON) have several advantages over traditional PONs including high receiver sensitivity, flexible channel selection, and a wide range of complex optical modulation formats and pulse shaping technology. The advantages of CPONs also include an exceptionally high data throughput over a long distance of over fifty kilometers.

With increased traffic and bandwidth carried by CPONs, ensuring a reliable and robust connectivity has become critical to network operators. Emerging applications in the field of remote health monitoring, telerobotic surgery, autonomous cars, home security and other fields require uninterrupted access service to the end user. Although there are many existing optical protection and restoration architectures in backbone and metro networks, existing cable optical access networks are poorly protected. The existing optical network protection schemes rely heavily on active switches and back-up fiber links and are inefficient in both cost and energy consumption.

SUMMARY

The present embodiments include optical taps that reconfigure the signal path between normal operation mode and protection mode without introducing any active devices or altering the existing network topology. The optical taps disclosed herein are passive, multidirectional, and non-switching.

In a first aspect, a passive optical tap includes a first wavelength division multiplexer (WDM), a second WDM, a first optical splitter, and a second optical splitter. The first wavelength division multiplexer (WDM) has a first plurality of single-channel ports. The second WDM has a second plurality of single-channel ports. The first optical splitter has a first combined-power port optically coupled to a first one of the first plurality of single-channel ports and a first split-power port optically coupled to a first one of the second plurality of single-channel ports. The second optical splitter has a second combined-power port optically coupled to a second one of the second plurality of single-channel ports and a second split-power port optically coupled to a second one of the first plurality of single-channel ports.

In a second aspect, a self-healing optical network includes the passive optical tap described above, first and second optical-tap ports. The first optical-tap port is optically coupled to a multi-channel port of the first WDM of the passive optical tap. The second optical-tap port is optically coupled to a multi-channel port of the second WDM of the passive optical tap.

In a third aspect, a method includes coupling, to an optical splitter, an optical signal from a first one of a first plurality of single-channel ports of a first WDM. The method also includes splitting, with the optical splitter, the optical signal into first and second split optical signals. The method also includes coupling the first split optical signal to a first one of a second plurality of single-channel ports of a second WDM.

DETAILED DESCRIPTION

The present embodiments include the concept, structure, and operation principle of passive optical taps that may be used to redirect an optical network unit (ONU) to multiple optical line terminals (OLTs). The optical taps disclosed herein are passive and therefore may operate without a power supply. However, the optical taps may also include active elements, such as active monitors and splitters. The optical taps are multidirectional, supporting both downlink and uplink between OLTs and ONUs.

Figure 1:
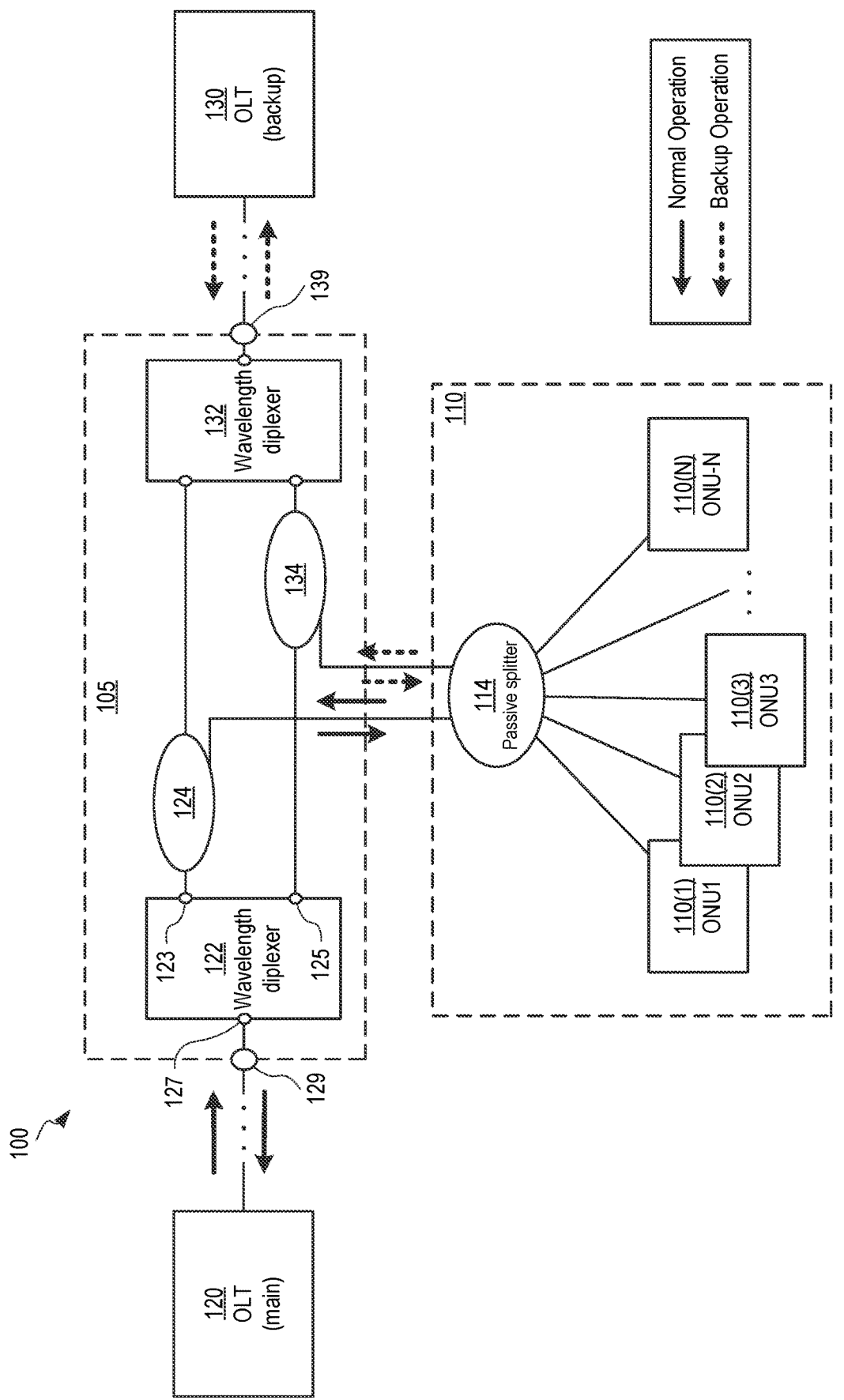
FIG. 1 illustrates an example optical access network that utilize a bidirectional passive optical tap structure.

FIG. 1 illustrates an optical access network 100 that utilizes a bidirectional passive optical tap structure. Optical access network 100 includes a main OLT 120, a backup OLT 130, an optical tap 105, and an ONU cluster 110. The optical tap 105 includes wavelength diplexers 122 and 132 and optical splitters 124 and 134. The ONU cluster 110 includes N ONUs 110 (1 . . . . N). The ONU cluster 110 may also include a passive splitter 114 that is connected to each ONU (i) of the ONU cluster 110, where i is a positive integer up to and including N. The passive splitter 114 is also connected to optical splitters 124 and 134. Optical splitters 124 and 134 are connected to wavelength diplexers 122 and 132. The optical splitters 124 and 134 may be 1×2 splitters with adjustable ratios. The wavelength diplexers 122 and 132, which may also be wavelength multiplexers, are connected to respective OLTs 120 and 130. Herein, splitters, such as optical splitters 124 and 134, and wavelength division multiplexers, such as wavelength diplexers 122 and 132, are bidirectional. As such, optical signals flow in both directions, downlink and uplink.

The optical tap 105 also includes output ports 129 and 139, which support light at all wavelengths. The wavelength diplexers 122 and 132 have inputs ports that support a wavelength range unique to that port. For example, the wavelength diplexer 122 includes input ports 123 and 125, each of which supports a unique wavelength range. An output port 127 of the wavelength diplexer 122, which is optically coupled to the output port 129, combines the input lights from the input ports 123 and 125 having different wavelengths and outputs the combined light of both wavelengths to the output port 129. While the terms input and output are used to describe the various optical ports herein, they are meant for clarity in description and do not imply a particular direction of signal flow. Unless stated otherwise, signals can flow through the present embodiments, or a component thereof, in both directions.

In an example operation, the optical splitter 124 is a 20/80 splitter and the optical splitter 134 is a 10/90 splitter. In this example, under normal mode of operation, the optical splitter 124 splits the weaker 20% signal to wavelength diplexer 132 and the stronger 80% signal to the passive splitter 114. The signal strength of the downlink signal from the main OLT 120 may be monitored by one or more ONUs in the ONU cluster 110 or by the backup OLT 130. When the received signal strength from the main OLT 120 falls below a pre-determined threshold level, the ONU 110 (i) may select the backup OLT 130 by switching the operating wavelength. Advantageously, switching between normal and backup operations does not require an active switch or a blocking protection. In this example, the optical splitter 134 is a 10/90 splitter, which splits the signal 10% to wavelength diplexer 122 and 90% to passive splitter 114. However, the optical splitters 124 and 134 may have any split ratios, such as 20/80, 50/50, or 10/90. The split ratios of the optical splitters 124 and 134 may be selected to optimize bidirectional performance of the network. In this example, the network 100 is protected from failure by including the optical tap 105 and the backup OLT 130, which advantageously may be added to an existing network that includes the ONU cluster 110 and the main OLT 120.

Figure 2:
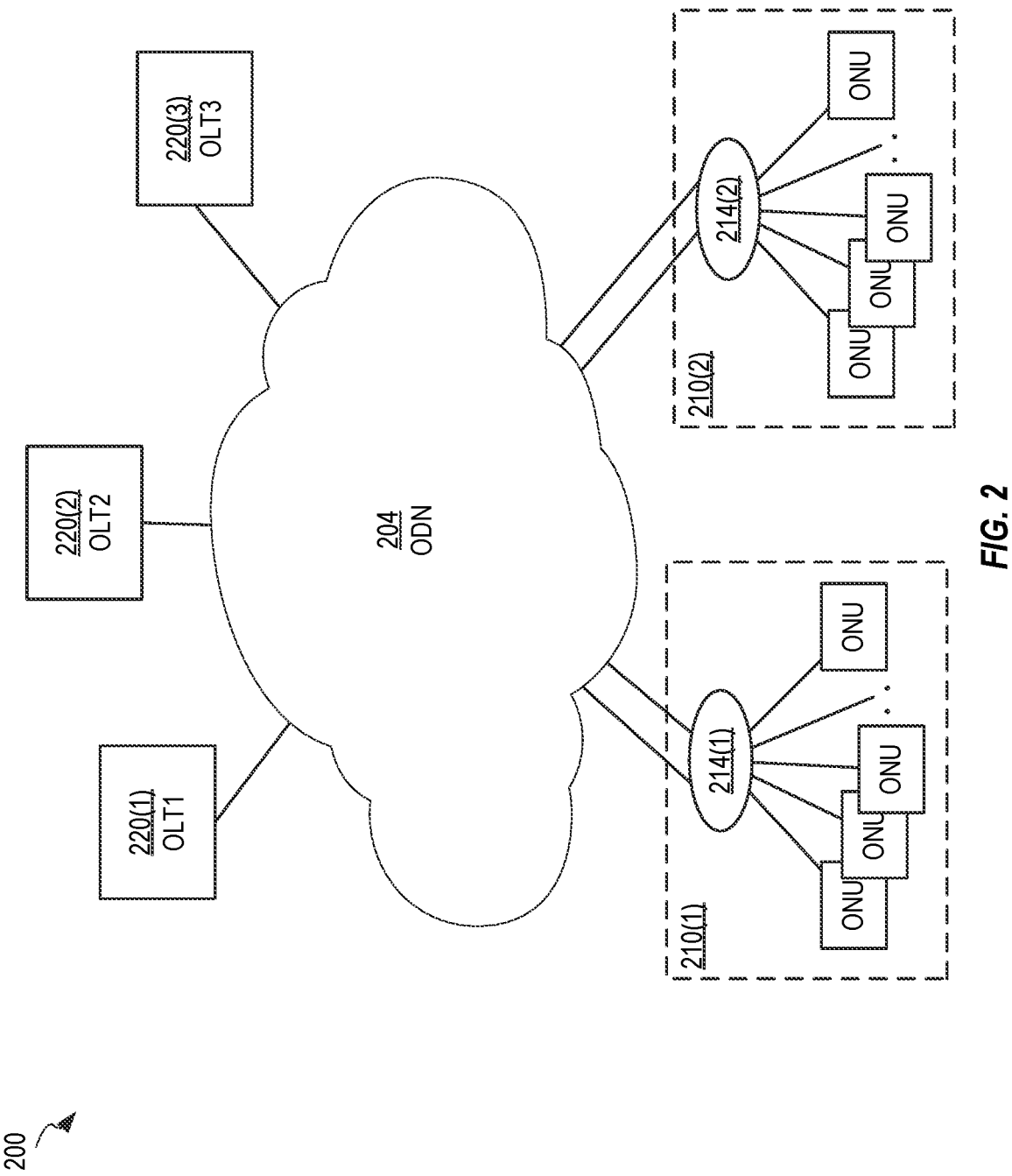
FIG. 2 illustrates a self-healing optical access network, in an embodiment.

The protection provided in the network 100 may be extended to a general network topology with multiple OLT and ONU modules. FIG. 2 illustrates a self-healing optical access network 200. The network 200 is an example of a general network topology that extends the network 100 of FIG. 1. The network 200 includes an optical distribution network (ODN) 204, a plurality of OLTs 220 (1 . . . 3), and a plurality of ONU clusters 210 (1) and 210 (2). Each ONU cluster 210 (j), where j is either 1 or 2, is an example of the ONU cluster 110 and may include any number of ONUs. The network 200 may include more or fewer OLTs and ONU clusters than shown in FIG. 2. The ODN 204 may include one or more optical taps, such as the optical tap 105 of FIG. 1. Each ONU cluster 210 (j) may be connected to any number of OLTs by one or more optical taps in the ODN 204.

Figure 3A:
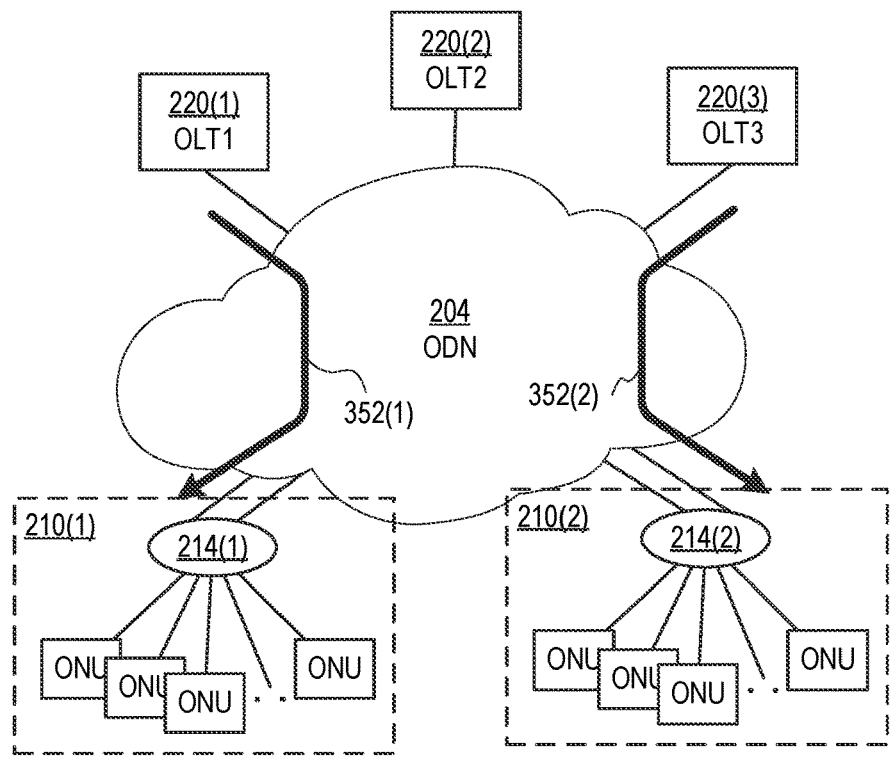
FIGS. 3A and 3B illustrate example operations of the self-healing optical access network of FIG. 2.
Figure 3B:
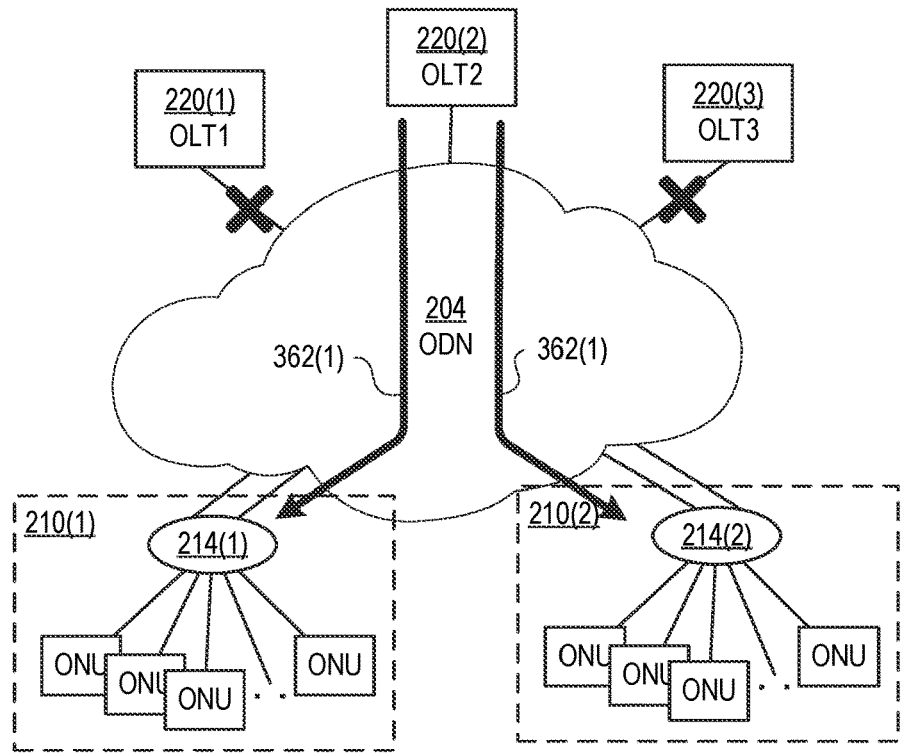

FIGS. 3A and 3B illustrate example operations of the self-healing optical access network 200 of FIG. 2. FIG. 3A shows an example operation under normal operating condition, where each ONU cluster 210 (j) is connected to an OLT that is closest to the ONU cluster 210 (j). In this case, the connection route may depend on factors that include optimizing power efficiency. For example, the ONU cluster 210 (1) is connected to OLT1 220 (1) through a connection 352 (1) and the ONU cluster 210 (2) is connected to OLT3 220 (3) through a connection 352 (2).

FIG. 3B shows an example operation of the self-healing optical access network 200 with failed connections to OLT1 220 (1) and OLT3 220 (3). The ONU clusters 210 (1) and 210 (2), having failed connections to their respective OLTs 220 (1) and 220 (3), get connected to an available OLT, OLT2 220 (2), through connections 362 (1) and 362 (2) to maintain communication using one or more optical taps in the ODN 204. Through the use of one or more optical taps in the ODN 204, the network 200 is self-healing and maintains protection against possible multiple failures in the network.

Figure 4:
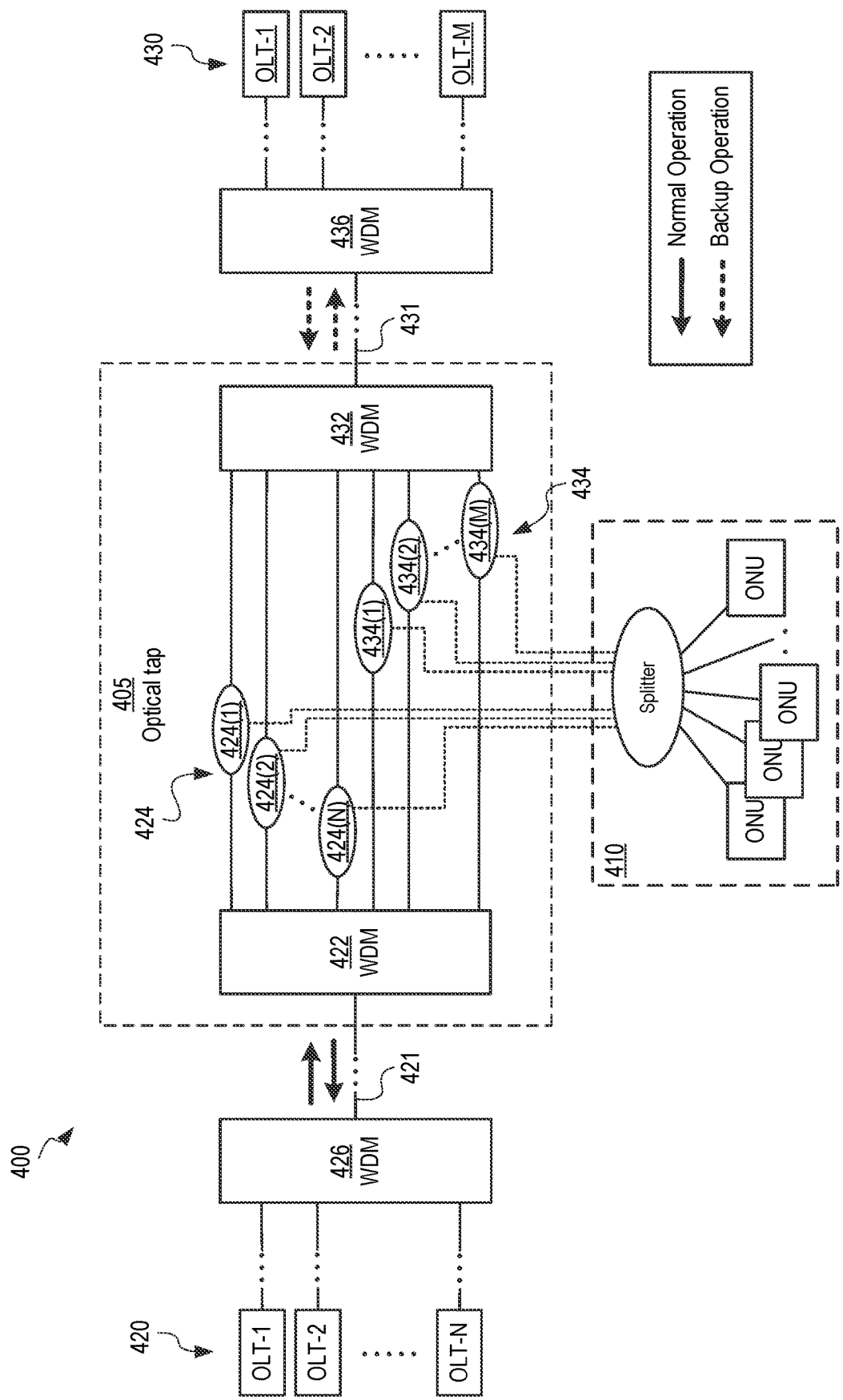
FIG. 4 illustrates a self-healing optical access network with multiplexed single connections, in an embodiment.

The self-healing optical access network 200 may be extended to include multiple OLTs in a multiplexed input and output network. FIG. 4 illustrates a self-healing optical access network 400 with multiplexed single connections. Each single connection in the network 400 may include both input and output or uplink and downlink. The network 400 extends the network 200 to include multiplexed single connections. FIG. 4 shows an ONU cluster 410 connected to N main OLTs 420 via a wavelength division multiplexer (WDM) 426 and M backup OLTs 430 via a WDM 436 for a total of N+M connections through an optical tap 405. In the network 400, signals from any number of main OLTs 420 and the corresponding backup OLTs 430 may be directed to any ONU in the ONU cluster 410.

The optical tap 405 includes WDMs 422 and 432 and optical splitters 424 and 434. The wavelength diplexers 122 and 132 are examples of the WDMs 422 and 432, respectively. The optical splitters 424, which are examples of the optical splitter 124, include optical splitters 424 (1) to 424(N). The optical splitters 434, which are examples of the optical splitter 134, include optical splitters 434 (1) to 434(M). Each optical splitter of the optical splitters 424 and 434 may have a pre-selected coupling ratio for coupling the corresponding main OLT 420 to backup OLTs 430 and the ONU cluster 410. The coupling ratios may be selected to optimize the network performance. Optical links 421 and 431, which may be optical fibers, connect uplink and downlink signals between the optical tap 405 and respective WDMs 426 and 436. By using WDMs in the network 400, no conflict exists between each OLT-ONU path.

As in the network 200, connection failures to any OLT of the main OLTs 420 are remedied by any backup OLT or a combination of backup OLTs 430.

Figure 5:
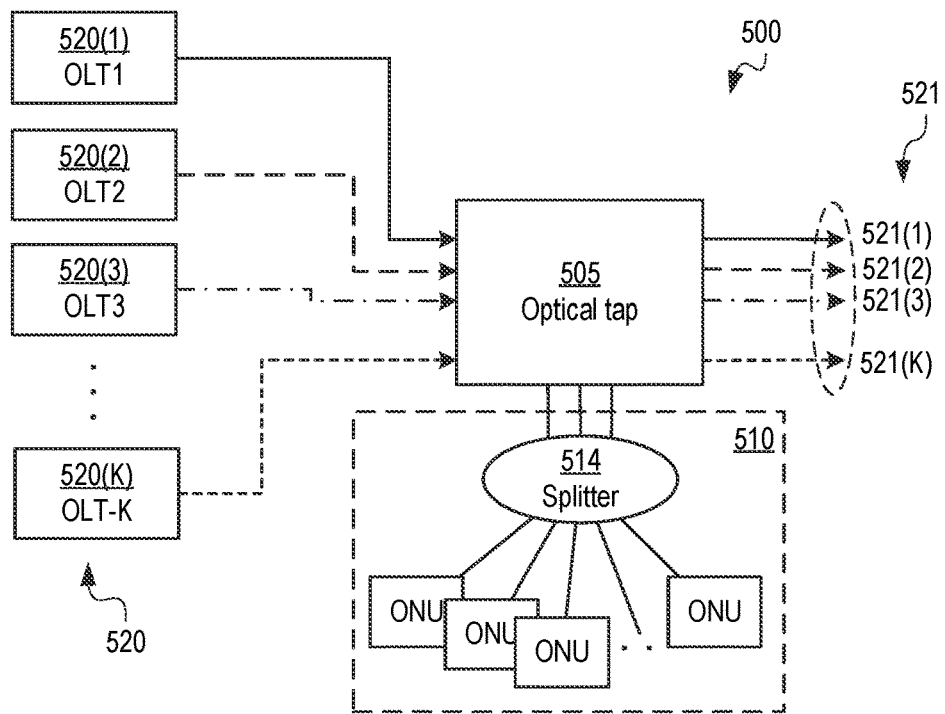
FIG. 5 illustrates self-healing optical access networks with multiple parallel connections, in an embodiment.
Figure 5:
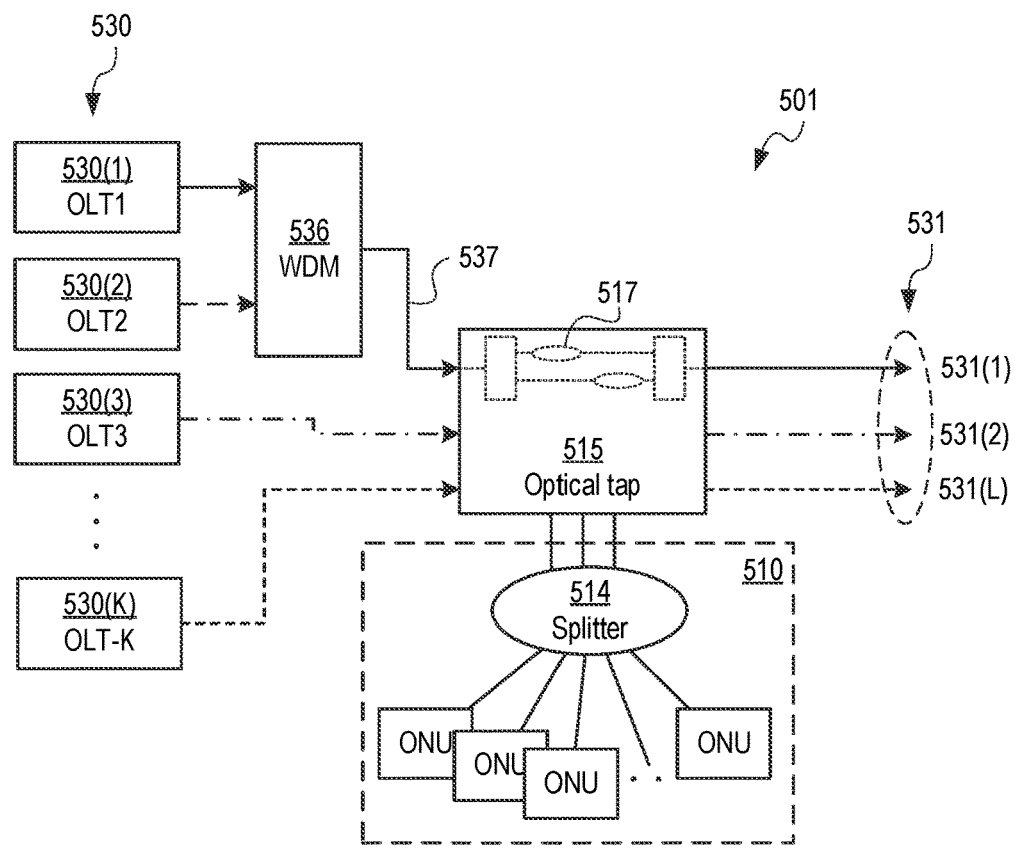

The self-healing optical access network 400 may be extended to include a combination of OLTs operating at the same wavelength. FIG. 5 illustrates self-healing optical access networks 500 and 501 with multiple parallel connections. Each parallel connection may contain both uplink and downlink. The network 500 is similar to the network 400 but includes multiple parallel connections. The network 500 includes a plurality of OLTs 520, an optical tap 505, an ONU cluster 510, and connection ports 521 to corresponding backup OLTs (not shown for clarity). The plurality of OLTs 520 includes a plurality of K OLTs from OLT1 520 (1) to OLT-K 520(K). The ONU cluster 510 includes an optical splitter 514, which may be a K×N passive splitter, where N is the number of ONUs in the ONU cluster 510. The connection ports 521 include K connection ports from a connection port 521 (1) to a connection port 521(K), each connection port corresponding to a parallel connection.

In the network 500, each OLT 520(k), where k is a positive integer up to and including K, operates at the same wavelength. To accommodate the multiple parallel connections, the optical tap 505 may include a plurality of optical taps, multiple input/output ports, or a combination thereof.

The network 501 is a generalized example of the network 500. The network 501 includes a plurality of OLTs 530, an optical tap 515, the ONU cluster 510, and connection ports 531. The network 501 may also include a WDM 536. The connection ports 531 connect to a plurality of corresponding backup OLTs (not shown). The plurality of OLTs 530 includes K number of OLTs from OLT1 530 (1) to OLT-K 530(K). Unlike the network 500, some of the plurality of OLTs 530 operate at different wavelengths. For example, OLT1 530 (1) and OLT2 530 (2) may operate at different wavelengths between the two OLTs. In that example, the WDM 536 may be used to combine the communications that include uplink and downlink between the two OLTs, OLT1 530 (1) and OLT2 530 (2), and the optical tap 515, such that one connection 537 optically couples both OLT1 530 (1) and OLT2 530 (2) to the optical tap 515. The optical tap 515 may include additional optical taps including an optical tap 517. The optical tap 517 is similar to the optical tap 405 of FIG. 4 and de-multiplexes and multiplexes signals to and from OLT1 530 (1) and OLT2 530 (2). The connection ports 531, unlike the connection ports 521, may have a smaller number of ports, L, where L & K, because of the multiplexed signals from the two OLTs 530 (1) and 530 (2).

Figure 6:
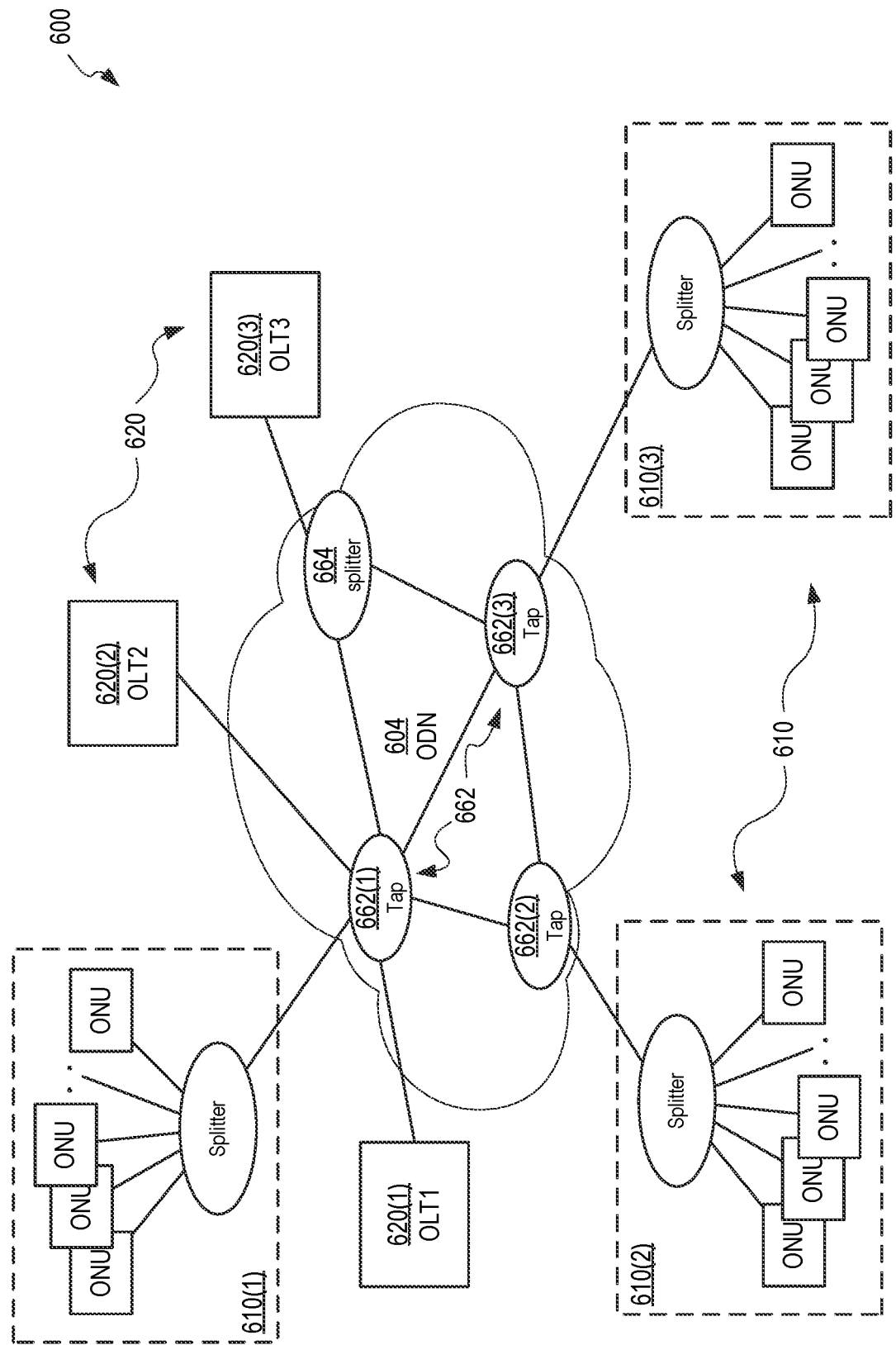
FIG. 6 illustrates a self-healing optical access network that includes aspects of examples shown in FIGS. 2, 4 and 5.

FIG. 6 illustrates a self-healing optical access network 600 that includes aspects of examples shown in FIGS. 2, 4 and 5. The network 600 is an example of a conceptual network topology using optical taps described herein and further extends from the network 200 of FIG. 2. The network 600 includes an ODN 604, a plurality of ONU clusters 610, and a plurality of OLTs 620. Each ONU cluster 610 (*i*), where i is a positive integer up to the total number of ONU clusters in the network, is an example of the ONU cluster 210. Although the illustration in FIG. 6 shows a limited number of each element in the network 600, the network in its implementation may include more or less of each element (e.g., ten ONU clusters 610, six OLTs 620, five optical taps 662, and two splitters 664). The ODN 604 includes a plurality of optical taps 662 and a plurality of splitters 664. Each optical tap 662 (*j*), where j is a positive integer up to the total number of optical taps, may include additional optical taps as described in reference to FIGS. 4 and 5. Each optical tap 662 (*j*) may be connected to other optical taps or optical splitters 664 in the ODN 604. Each optical tap 662 (*j*) may also be connected to an ONU cluster 610 (*i*) or an OLT or a collection of OLTs 620.

In operation, each ONU cluster 610 (*i*) may select an OLT based at least partially on the received signal strength as described in reference to FIGS. 3A and 3B. Each ONU cluster 610 (*i*) may also select a collection of OLTs for application needs, such as being used in a multiple parallel communication (e.g., FIG. 5). With the inclusion of optical taps in an ODN or in a signal path, each ONU cluster in the network gains the ability to select a backup OLT or a collection of backup OLTs should the existing connections fail. The process of selecting an OLT or a collection of OLTs may not require an active component, such as active switches, processors, etc. Advantageously, the embodiments described herein enhance network robustness by providing redundant OLT paths at minimal costs and may be implemented in existing network structures.

Figure 7:
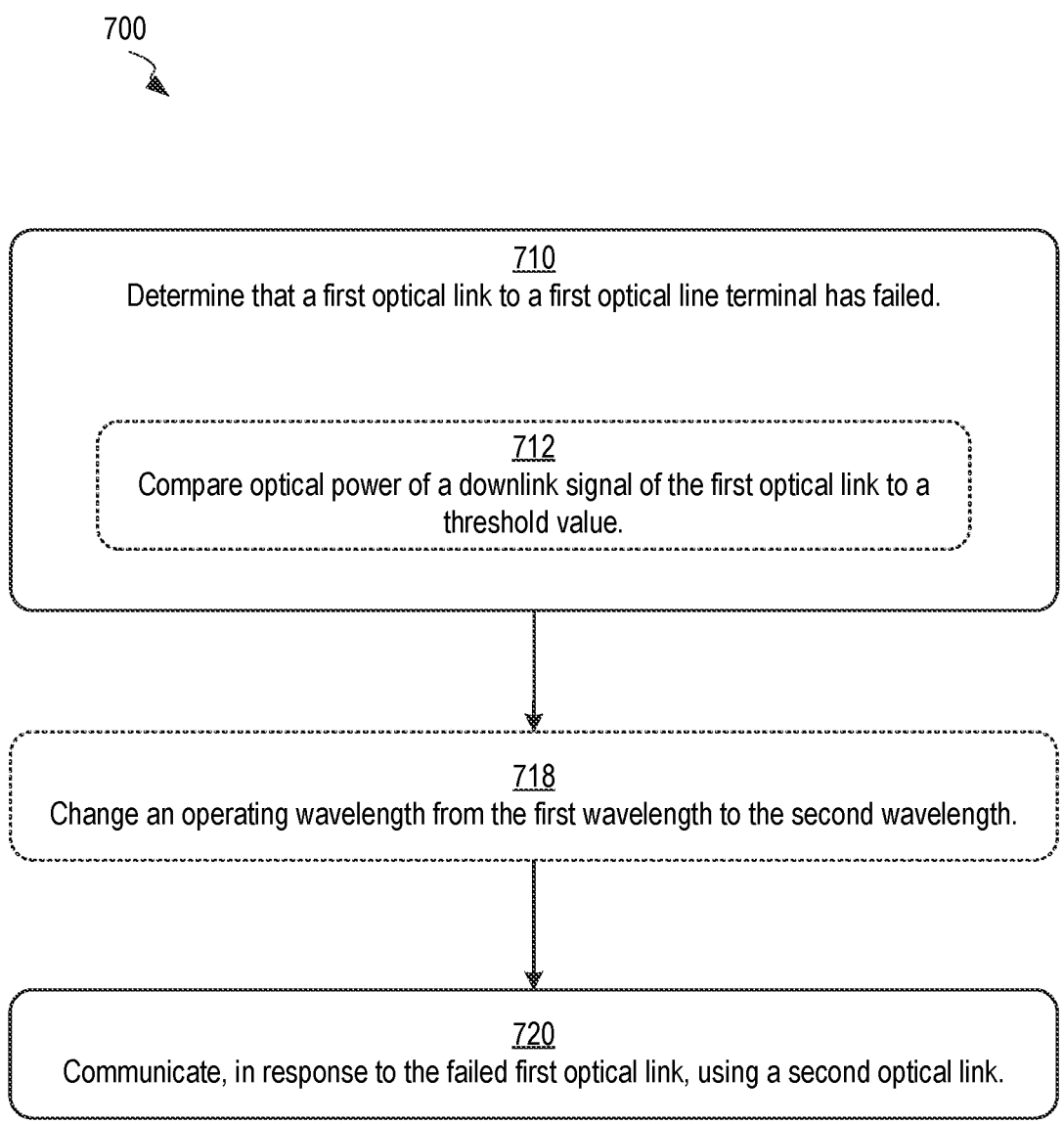
FIG. 7 shows a method for a self-healing optical access network, in an embodiment.

FIG. 7 shows a method 700 for a self-healing optical access network. The method 700 may be implemented in part or in full by the networks 100, 200, 500, 501, and 600. The method 700 includes steps 710 and 720. The method 700 may also include a step 718. The method 700 may also include additional steps without departing from the scope thereof.

The step 710 includes determining that a first optical link to a first OLT has failed. The step 710 may include a step 712 for determining that the first optical link has failed. The failure may include decreasing or decreased signal strength from the first OLT. The step 712 includes comparing optical power of a downlink signal of the first optical link to a threshold value. In an example of step 712, the decreasing or decreased signal strength from the main OLT 120 of FIG. 1 is compared to a pre-determined threshold value. When the signal strength falls below the pre-determined threshold value, the connection to the main OLT 120 is determined to have failed. The steps 710 and 712 may be performed by a node in a node cluster. An example of the node cluster is ONU cluster 110. In this example, one or more of the ONUs in the ONU cluster 110, monitoring the downlink signal strength and communicating with the main OLT 120 determine whether the connection to the main OLT 120 has failed. The steps 710 and 712 may also be performed by other elements in the network. For example, the backup OLT 130 may monitor the optical power of the split downlink signal, which originate from the main OLT 120, from the optical splitter 124. The backup OLT 130 may determine that the main OLT 120 or the connection to the main OLT 120 has failed based on the optical strength of the monitored downlink signal.

The step 718, if executed, includes changing an operating wavelength from the first wavelength to the second wavelength. In an example of step 718, the main OLT 120 and the backup OLT 130 of FIG. 1 operate at different wavelengths: the main OLT 120 operating at the first wavelength, and the backup OLT 130 operating at the second wavelength. Having determined that the connection to the main OLT 120 has failed in the step 710, the ONU cluster 110 selects the second wavelength to communicate with the backup OLT 130.

The step 720 includes communicating, in response to the failed first optical link, using a second optical link. In an example of step 720, the ONU cluster 110, after having determined that the connection to the main OLT 120 has failed, selects the backup OLT 130. Selecting the backup OLT 130 may include communicating at a different wavelength as described above in step 718. By changing the operating wavelength to use the backup OLT 130, the network 100 continues to operate without a failure of the network.

In an example of implementing an optical tap, the optical tap 105 of FIG. 1 may be added to an existing network that includes the main OLT 120 and the ONU cluster 110. The backup OLT 130 may also be a part of the existing network. Advantageously, implementation of this redundancy by simply adding a passive optical tap described herein may be completed with minimal costs.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:
1. A passive optical tap comprising:
 a first wavelength division multiplexer (WDM) having a first plurality of single-channel ports;
 a second WDM having a second plurality of single-channel ports;

a first passive optical splitter having a first combined-power port optically coupled to a first one of the first plurality of single-channel ports and a first split-power port optically coupled to a first one of the second plurality of single-channel ports; and a second passive optical splitter having a second combined-power port optically coupled to a second one of the second plurality of single-channel ports and a second split-power port optically coupled to a second one of the first plurality of single-channel ports.

2. The passive optical tap of claim 1, further comprising a first optical-tap port optically coupled to a multi-channel port of the first WDM.

3. The passive optical tap of claim 2, the first optical-tap port being optically coupled to a first optical line terminal.

4. The passive optical tap of claim 3, further comprising a second optical-tap port optically coupled to a multi-channel port of the second WDM.

5. The passive optical tap of claim 4, the second optical-tap port being optically coupled to a second optical line terminal.

6. The passive optical tap of claim 5, wherein:
the first optical line terminal is configured to operate at a first wavelength; and
the second optical line terminal is configured to operate at a second wavelength that differs from the first wavelength.

7. The passive optical tap of claim 1, wherein the first and second WDMs are wavelength diplexers.

8. A self-healing optical network, comprising:
the passive optical tap of claim 1;
a first optical-tap port optically coupled to a multi-channel port of the first WDM of the passive optical tap; and
a second optical-tap port optically coupled to a multi-channel port of the second WDM of the passive optical tap.

9. The self-healing optical network of claim 8, further comprising a third WDM having a third plurality of single-channel ports and a multi-channel port, wherein:
each of the third plurality of single-channel ports is optically coupled to a respective one of a first plurality of optical line terminals; and
the multi-channel port of the third WDM is optically coupled to the first optical-tap port.

10. The self-healing optical network of claim 9, each of the first plurality of optical line terminals having a different operating wavelength.

11. The self-healing optical network of claim 10, further comprising a fourth WDM having a fourth plurality of single-channel ports and a multi-channel port, wherein:
each of the fourth plurality of single-channel ports is optically coupled to a respective one of a second plurality of optical line terminals; and
the multi-channel port of the fourth WDM is optically coupled to the second optical-tap port.

12. The self-healing optical network of claim 11, each of the second plurality of optical line terminals having a different operating wavelength.

13. A method comprising:
coupling, to a first passive optical splitter, an optical signal from a first one of a first plurality of single-channel ports of a first WDM;
splitting, with the first passive optical splitter, the optical signal into first and second split optical signals;
coupling the first split optical signal to a first one of a second plurality of single-channel ports of a second WDM;
coupling, to a second passive optical splitter, a backup optical signal from a second one of the second plurality of single-channel ports;
splitting, with the second passive optical splitter, the backup optical signal into third and fourth split optical signals; and
coupling the third split optical signal to a second one of the first plurality of single-channel ports.

14. The method of claim 13, further comprising coupling the second and fourth split optical signals to a node cluster.

15. The method of claim 14, further comprising coupling the optical signal from a first optical-tap port to a multi-channel port of the first WDM.

16. The method of claim 15, further comprising coupling the backup optical signal from a second optical-tap port to a multi-channel port of the second WDM.

17. The method of claim 16, further comprising receiving the optical signal, via the first optical-tap port, from a first optical line terminal operating at a first wavelength.

18. The method of claim 17, further comprising receiving the backup optical signal, via the second optical-tap port, from a second optical line terminal operating at a second wavelength that differs from the first wavelength.

19. The method of claim 18, further comprising:
coupling a return optical signal from the node cluster to the first passive optical splitter;
coupling the return optical signal from the first passive optical splitter to the first one of the first plurality of single-channel ports;
coupling the return optical signal from the multi-channel port of the first WDM to the first optical-tap port; and
transmitting the return optical signal from the first optical-tap port to the first optical line terminal;
wherein the return optical signal has the first wavelength.

20. The method of claim 19, further comprising:
coupling a backup return optical signal from the node cluster to the second passive optical splitter;
coupling the backup return optical signal from the second passive optical splitter to the second one of the second plurality of single-channel ports;
coupling the backup return optical signal from the multi-channel port of the second WDM to the second optical-tap port; and
transmitting the backup return optical signal from the second optical-tap port to the second optical line terminal;
wherein the backup return optical signal has the second wavelength.

* * * * *